United States Patent [19]

Shimizu et al.

[11] Patent Number: 5,105,129

[45] Date of Patent: Apr. 14, 1992

[54] RAINDROP DETECTION WIPER

[75] Inventors: Hiroyuki Shimizu; Toyokazu Nakamura; Junichi Takao, all of Yokohama, Japan

[73] Assignee: Jidosha Denki Kogyo K.K., Kanagawa, Japan

[21] Appl. No.: 644,652

[22] Filed: Jan. 23, 1991

[30] Foreign Application Priority Data

Jan. 24, 1990 [JP] Japan .................. 2-5136[U]

[51] Int. Cl.⁵ .............................................. H02P 3/00
[52] U.S. Cl. ............................. 318/266; 318/DIG. 2; 318/443; 15/250 C
[58] Field of Search ................... 318/264–266, 318/280–286, 276–279, 443, 444, 483, DIG. 2, 452, 453, 454, 465–469; 15/250 C, 250.12, 250.13, 250.17

[56] References Cited

U.S. PATENT DOCUMENTS

| | | | |
|---|---|---|---|
| 4,158,798 | 6/1979 | Holt | 15/250.12 |
| 4,320,329 | 3/1982 | Gille et al. | 15/250.12 |
| 4,495,452 | 1/1985 | Boegh-Peterson | 15/250 C |
| 4,499,410 | 2/1985 | Iacoponi et al. | 15/250 C |
| 4,625,157 | 11/1986 | Phillimore | 15/250 C |
| 4,689,536 | 8/1987 | Iyoda | 15/250 C |
| 4,710,878 | 12/1987 | Iyoda | 318/DIG. 2 |
| 4,748,390 | 5/1988 | Okushima et al. | 318/483 |

*Primary Examiner*—William M. Shoop, Jr.
*Assistant Examiner*—A. Jonathan Wysocki
*Attorney, Agent, or Firm*—Sughrue, Mion, Zinn, Macpeak & Seas

[57] ABSTRACT

A raindrop detection wiper is provided with a raindrop detector for detecting a raindrop, a wiper motor for actuating a wiper blade, an automatic stop mechanism for stopping the wiper blade at a predetermined position, a control mechanism comprising a current detector, a memory and the like for operating intermittently or stopping the wiper motor in accordance with a signal from the raindrop detector and memory data stored by the memory. According to this invention, it is possible to wipe the wiping surface automatically by detecting the raindrop and drive current of the wiper motor even in a very light rain.

3 Claims, 3 Drawing Sheets

RAINDROP DETECTION WIPER

BACKGROUND OF THE INVENTION

1. Field of the Invention

This invention relates to the wiper device to wipe, for example, automobile windshields, particularly to the raindrop detection wiper which operates automatically by detecting raindrops.

2. Description of the Prior Art

FIG. 3 shows an example of the conventional wiper.

An intermittence control circuit (101) is connected to a drive circuit (102) in a wiper device (100) shown in the diagram.

A wiper motor (103) connects to the drive circuit (102), and an output shaft (103a) of the wiper motor (103) connects to a wiper arm (106) fitted with a wiper blade (105) through a link joint (104).

The wiper motor (103) contains an automatic stop mechanism (103b) to stop the wiper blade (105) in the stop position (B) on a wiping surface (110). The automatic stop mechanism (103b) is provided with an outer conducting plate (103c) and an inner conducting plate (103d), interlocking to the output shaft (103a).

The automatic stop mechanism (103b) is provided with a contact (103e), which connects with and disconnects from the outer conducting plate (103c), on one side and a contact (103f), which connects with and disconnects from the inner conducting plate (103d), on the other side.

Power is supplied to the wiper motor (103) through the drive circuit (102) to operate the wiper motor (103).

The output shaft (103a) rotates when the wiper motor (103) operates, and the wiper arm (106) swings reciprocatingly through the link joint (104) so that the wiper blade (105) wipes the wiping surface (110) between the stop position (B) and turn back position (A).

The wiper motor (103) is operated in accordance with the set time of the timer, which is not illustrated, installed in the intermittence control circuit (101). The wiper motor (103) is stopped by the function of the automatic stop mechanism (103b) at the state in which the wiper blade (105) is stopped at the stop position (B).

However, above-mentioned conventional wiper device (100) operates the wiper motor (103) in accordance with the instructions given by the intermittence control circuit (101). Therefore, in the case of actuating the wiper blade (105), the switch has to be selected by manual operation, causing extra trouble. A solution of this problem has been a challenge.

SUMMARY OF THE INVENTION

The present invention is made in view of the problem of the aforementioned conventional wiper device, it is an object to provide a raindrop detection wiper which is possible to wipe the wiping surface even in a very light rain, such as a drizzle, by detecting the state of rain, minutely.

The construction of the raindrop detection wiper according to this invention for attaining the aforementioned object is characterized by comprising a raindrop detector for detecting a raindrop, a wiper motor for actuating a wiper blade to wipe a wiping surface, an automatic stop mechanism provided to the wiper motor for stopping the wiper blade at a preset position, a control mechanism provided with a current detection means to detect a drive current of the wiper motor, a discrimination means to discriminate current data detected by the current detection means, a memory means to store discrimination data discriminated by the discrimination means and a clearing means to clear memory data stored by the memory means in accordance with working of said automatic stop mechanism, for operating intermittenly or stopping the wiper motor in accordance with a signal from the raindrop detector and the memory data.

In the raindrop detection wiper according to this invention, the rain condition can be grasped by detecting the drive current of the wiper motor using the current detection means because the motor load is reduced by rainwater existing between the wiping surface and the wiper blade. The raindrop detection wiper according to this invention is so structured as to drive the wiper motor automatically and securely through the control mechanism even in a drizzling rain by sensing the rain condition minutely using the raindrop detector and the current detection means and by processing the data using the discrimination means, the memory means and the clearing means.

DESCRIPTION OF THE PREFERRED EMBODIMENT

Figure 1:
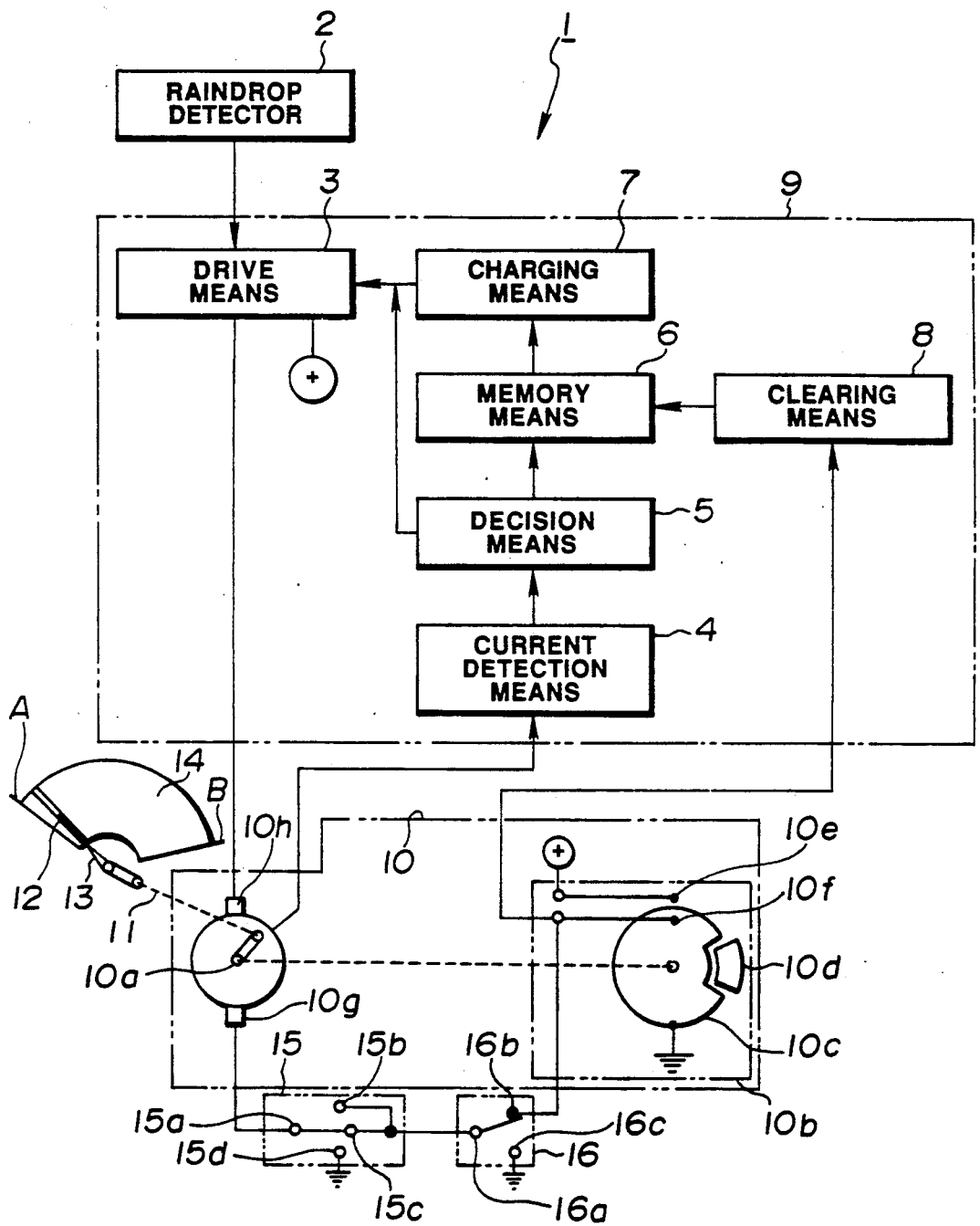
FIG. 1 is a block diagram illustrating the raindrop detection wiper according to an embodiment of this invention.
Figure 2:
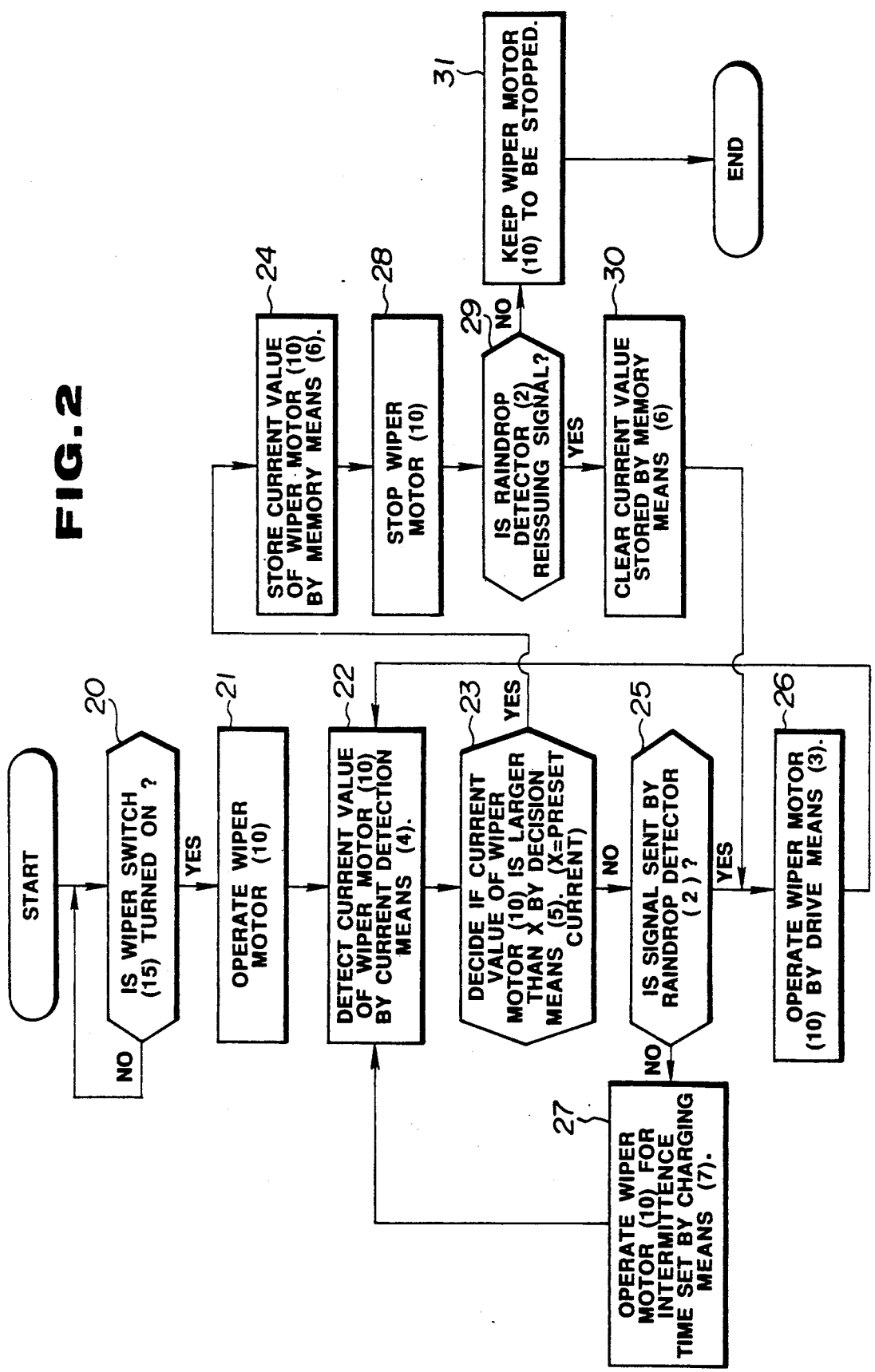
FIG. 2 is a flow chart explaining the control of the raindrop detection wiper shown in FIG. 1.
Figure 3:
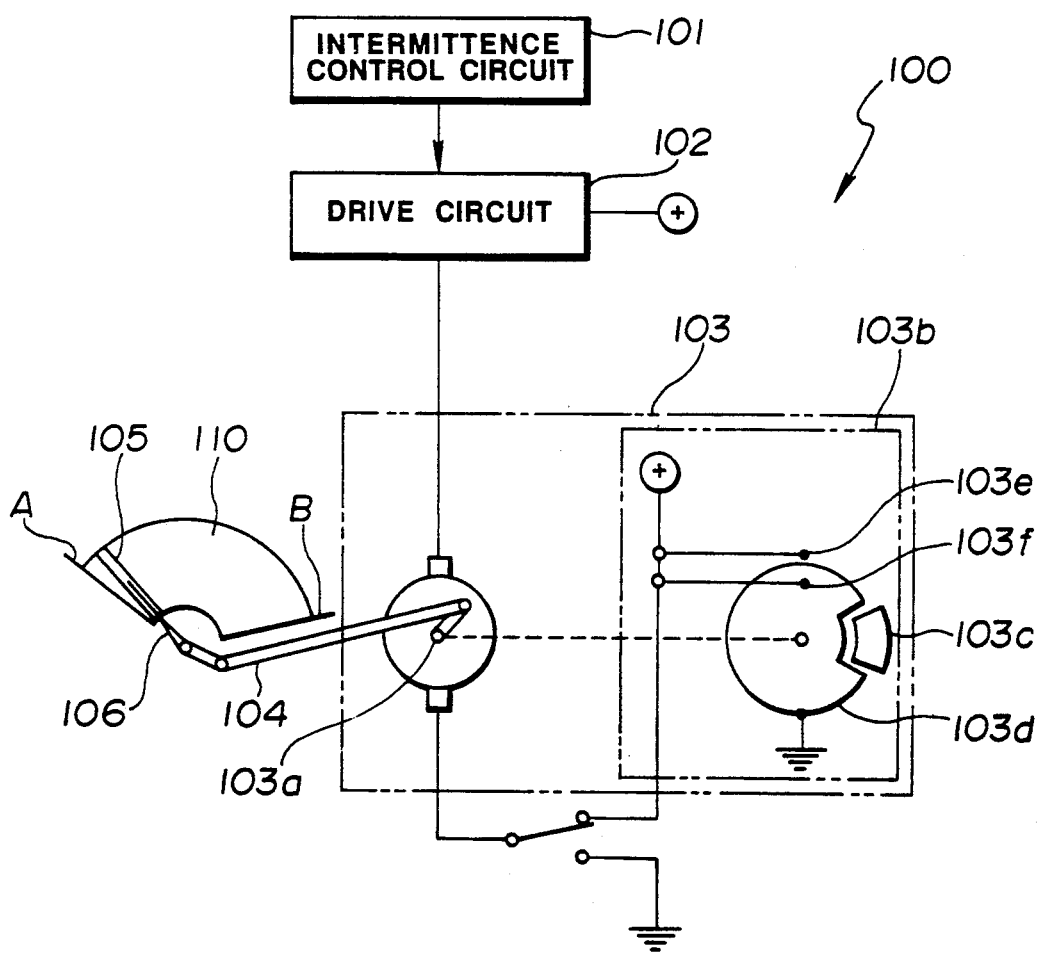
FIG. 3 is a schematic block diagram of the conventional wiper device.

A raindrop detection wiper according to this invention will be described below on basis of FIG. 1 and FIG. 2.

The illustrated raindrop detection wiper (1) has an vibration device, consisting of a piezoelectric or electrostriction element, connected with an amplifier. A raindrop detector (2) to detect raindrops and to convert their vibration components into electrical signals is mounted on the bonnet so that raindrops on the vehicle may be easily detected.

The raindrop detector (2) is connected to a control mechanism (9), which is provided with a drive means (3), a current detection means (4), a decision means (5), a memory means (6), a charging means (7) and a clearing means (8). A wiper motor (10) is connected to this control mechanism (9).

An output shaft (10a) of the wiper motor (10) couples with a link joint (11) which connects to the base side of a wiper arm (13) attached with a wiper blade (12) at its tip end.

By rotating the output shaft (10a), the wiper blade (12) wipes a wiping surface (14) between both turning positions (A) and (B).

The wiper motor (10) contains an automatic stop mechanism (10b) linked to the output shaft (10a). The automatic stop mechanism (10b) is provided with an inner conducting plate (10c) connected to ground and an outer conducting plate (10d) isolated from this inner conducting plate (10c).

The automatic stop mechanism (10b) is provided with an automatic stop contact (10f), which connects with and disconnects from the inner conducting plate (10c) and outer conducting plate (10d), on one side and another automatic stop contact (10e), which is connected to the power source and connects with and disconnects from the outer conducting plate (10d).

A movable contact (15a) of a wiper switch (15) is connected to a power terminal (10g) on one side of the wiper motor (10), and a movable contact (16a) of a relay (16) is connected to an intermittent-contact (15c), linking with an off-contact (15b) and the charging means (7). A low-contact (15d) is connected to ground.

The automatic stop contact (10f) on one side connects to a fixed contact (16b) on one side of the relay (16) and a fixed contact (16c) on the other side is connected to ground.

An electrical signal from the raindrop detector (2) is input to the drive means (3). The power source is connected to the power terminal (10h) on the other side of the wiper motor (10).

The drive current of the wiper motor (10) is input to the current detection means (4) and outputs the drive current as current data.

The decision means (5) is given current data from the current detection means (4) for a discrimination as to whether or not this current data is larger than a preset current value (X), and outputs the current data as discrimination data.

The memory means (6) is given the decision data (detection value of the current data) discriminated by the discrimination means (5) and outputs the discrimination data as memory data.

The charging means (7) is given the memory data stored by the memory means (6). If the memory data value is smaller than the preset current value, the wiper motor (10) is operated for the discriminated intermittent time or by input from the raindrop detector (2). If the memory data stored by the memory means (6) is larger than the preset current value, the stored memory data is not input to the charging means (7), and the wiper motor (10) is stopped, being unable to operate. The clearing means (8) is given a ground signal from a grounding contact (10f), which connects with and disconnects from the inner conducting plate (10c) mounted on the automatic stop mechanism (10b). The memory data stored by the memory means (6) is cleared by processing, through this ground signal, that the automatic stop contact (10f) on one side has contacted with the inner conducting plate (10c).

Next, the operation of the raindrop detection wiper (1) will be explained below on basis of the flow chart shown in FIG. 2.

Whether or not the wiper switch (15) is turned on is decided at the state in which an ignition switch (not shown) is changed on in Step 20.

In Step 20, the operation proceeds to the next step, Step 21, if the wiper switch (15) is discriminated to be on, that is, the movable contact (15a) is discriminated to be contacting the intermittent-contact (15c) (YES). If the switch (15) is decided not to be switched on (NO) in Step 20, discrimination will be repeated (standby) in this Step 20.

In Step 21 to which the operation proceeds when the switch (15) is in its on-state at Step 20, the electric power is supplied to the power terminal (10h) of the wiper motor (10) through the drive means (13) at the same time the switch (15) is switched on because the drive means (13) is already charged by the charging means (7) before the switch (15) is switched on, and the wiper motor (10) is operated. And the wiper arm (13) is swung reciprocatingly by the rotation of the output shaft (10a) through the link joint (11) so that the wiper blade (12) moves back and forth for one time and wipes the wiping surface (14) between the both turning positions A and B, and the operation proceeds to Step 22.

The drive current of the wiper motor (10) is detected by the current detection means (4) in Step 22 and the operation proceeds to Step 23.

Discrimination is made by the discrimination means (5) in Step 23 as to whether or not the current data detected by the current detection means (4) is larger than the preset current value.

The operation proceeds to Step 24 if the current data is discriminated to be larger than the preset current value (YES) in Step 23, or proceeds to Step 25 if the current data is discriminated to be smaller than the preset current value (NO).

In Step 25, discrimination is made as to whether or not a signal (electrical signal) is output by the raindrop detector (2).

If the decision is made in Step 25 that the raindrop detector (2) is outputing the signal (YES), the operation proceeds to Step 26, or proceeds to Step 27 when the decision is made that the raindrop detector (2) is not outputting the signal (NO).

In Step 26, the movable contact (16a) of the relay (16) contacts the fixed contact (16c) on the other side through the drive means (3), and the electric power is supplied to the power terminal (10h) on the other side of the wiper motor (10).

When the electric power is supplied to the power terminal (10h) on the other side of the wiper motor (10), the wiper motor (10) rotates the output shaft (10a), and the wiper arm (13) swings reciprocatingly through the link joint (11). The wiper blade (12) wipes the wiping surface (14) between the both turning positions A and B, and then the operation proceeds to the aforementioned Step 22.

In Step 27, an intermittence time is discriminated by the charging means (7), and the movable contact (16a) of the relay (16) contacts the fixed contact (16c) on the other side through the drive means (3) to operate the wiper motor (10) for the intermittence time. Subsequently, the operation proceeds to the Step 22.

In Step 24 after proceeding from Step 23, the discrimination data discriminated to be large than the preset current value by the discrimination means (5) is stored by the memory means (6) as memory data, and the operation proceeds to Step 28.

In Step 28, the memory data stored at the above-mentioned Step 24 is not input to the charging means (7), thereby stopping the wiper motor (10) and the operation proceeds to next, Step 29.

In Step 29, discrimination is made again whether the raindrop detector (2) is outputting a signal or not.

If the discrimination is made in Step 29 that the raindrop detector (2) is outputting the signal (YES), the operation proceeds to Step 30, or proceeds to Step 31 when the discrimination is made in Step 29 that the raindrop detector (2) is not outputting the signal (NO).

In Step 30 to which the operation proceeds when the discrimination is made in Step 29 that the raindrop detector (2) is outputting the signal, the current value of the wiper motor (10) stored by the memory means (6) is cleared and the operation proceeds to the Step 26.

If discrimination is made in Step 29 that the raindrop detector (2) is not outputting a signal, the wiper motor (10) is kept in the suspended state at Step 31.

By changing the movable contact (15a) of the switch (15) to the off-contact (15b), the wiper motor (10) ends its operation.

As mentioned above, the raindrop detection wiper according to this invention comprises a raindrop detector for detecting a raindrop, a wiper motor for actuating a wiper blade to wipe a wiping surface, an automatic stop mechanism provided to the wiper motor for stopping the wiper blade at a preset position, a control mechanism provided with a current detection means to detect a drive current of the wiper motor, a discrimination means to discriminate current data detected by the current detection means, a memory means to store discrimination data discriminated by the discrimination means and a clearing means to clear memory data stored by the memory means in accordance with working of said automatic stop mechanism, for operating intermittenly or stopping the wiper motor in accordance with a signal from the raindrop detector and the memory data. Therefore, the raindrop condition is processed by the raindrop detector, the current detection means, the discrimination means, the memory means and clearing means to operate intermittenly or stop the wiper motor so that the wiper motor can be controlled by detecting the rain condition varying with the time very minutely. Accordinly, an excellent effect can be obtained since it is possible to wipe the wiping surface automatically even in a very light rain, such as a drizzle.

What is claimed is:

1. A raindrop detection wiper comprising:
    a raindrop detector for detecting a raindrop;
    a wiper motor for actuating a wiper blade to wipe a wiping surface;
    an automatic stop mechanism provided to said wiper motor for stopping said wiper blade at a preset position;
    a control mechanism provided with a current detection means to detect a drive current of said wiper motor, a decision means to discriminate output data based on current data detected by said current detection means, a memory means to store discrimination data discriminated by said decision means and a clearing means to clear memory data stored by said memory means in accordance with working of said automatic stop mechanism, for operating intermittently or stopping the wiper motor in accordance with a signal from said raindrop detector and said memory data.

2. A raindrop detection wiper as set forth in claim 1, wherein said control mechanism is further provided with a charging means to control a moving interval of the wiper blade.

3. A method for controlling a wiper device comprising;
    detecting existence of a raindrop by using a raindrop detector;
    dectecting a drive current of a wiper motor;
    discriminating whether or not said drive current of the wiper motor is smaller than a reference value by a decision means;
    storing discrimination data discriminated by said decision means in a memory means;
    operating the wiper motor under a condition selected according to a signal output from said raindrop detector and memory data stored in said memory means; and
    clearing the memory data stored in the memory means in accordance with working of an automatic stop mechanism for a wiper blade.

* * * * *